March 31, 1925.

G. BROWN, JR
AUTOMOBILE LOCK
Filed Jan. 3, 1920

Inventor
Garrett Brown Jr.
By
Poindexter Attys

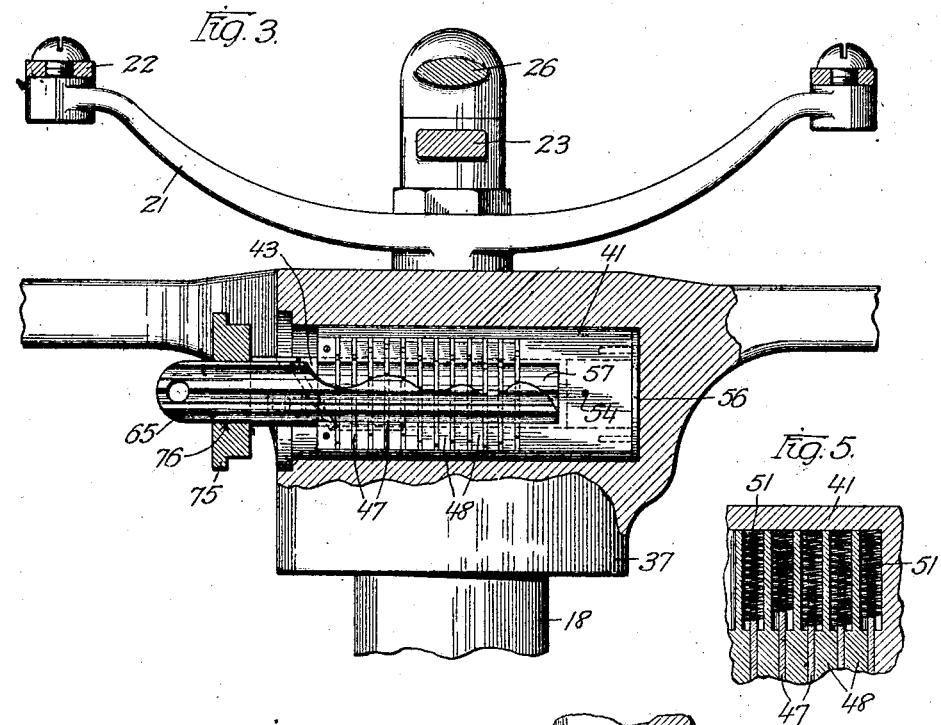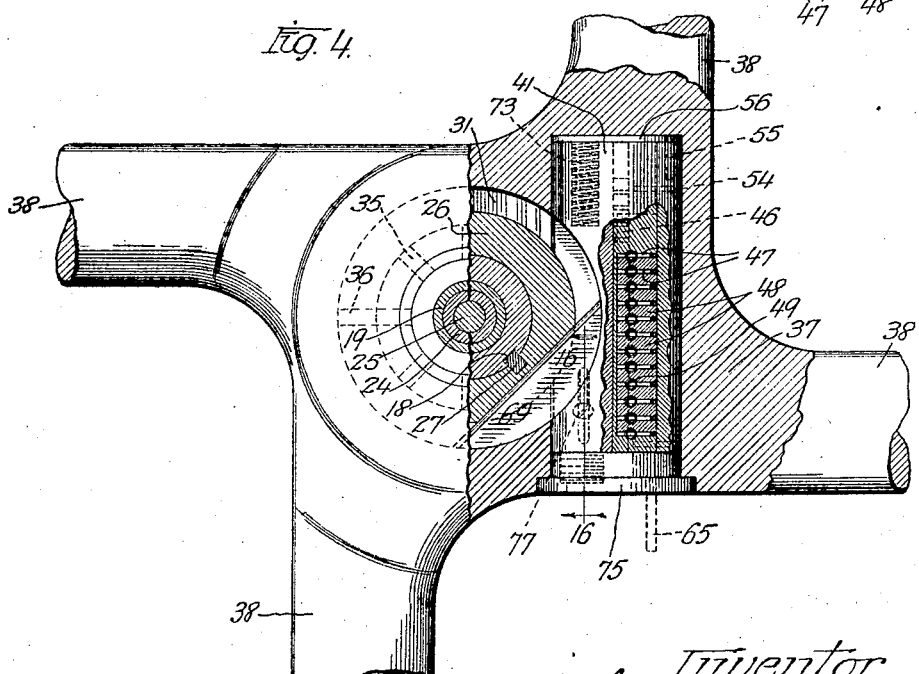

March 31, 1925.
G. BROWN, JR
1,531,538
AUTOMOBILE LOCK
Filed Jan. 3, 1920
3 Sheets-Sheet 3
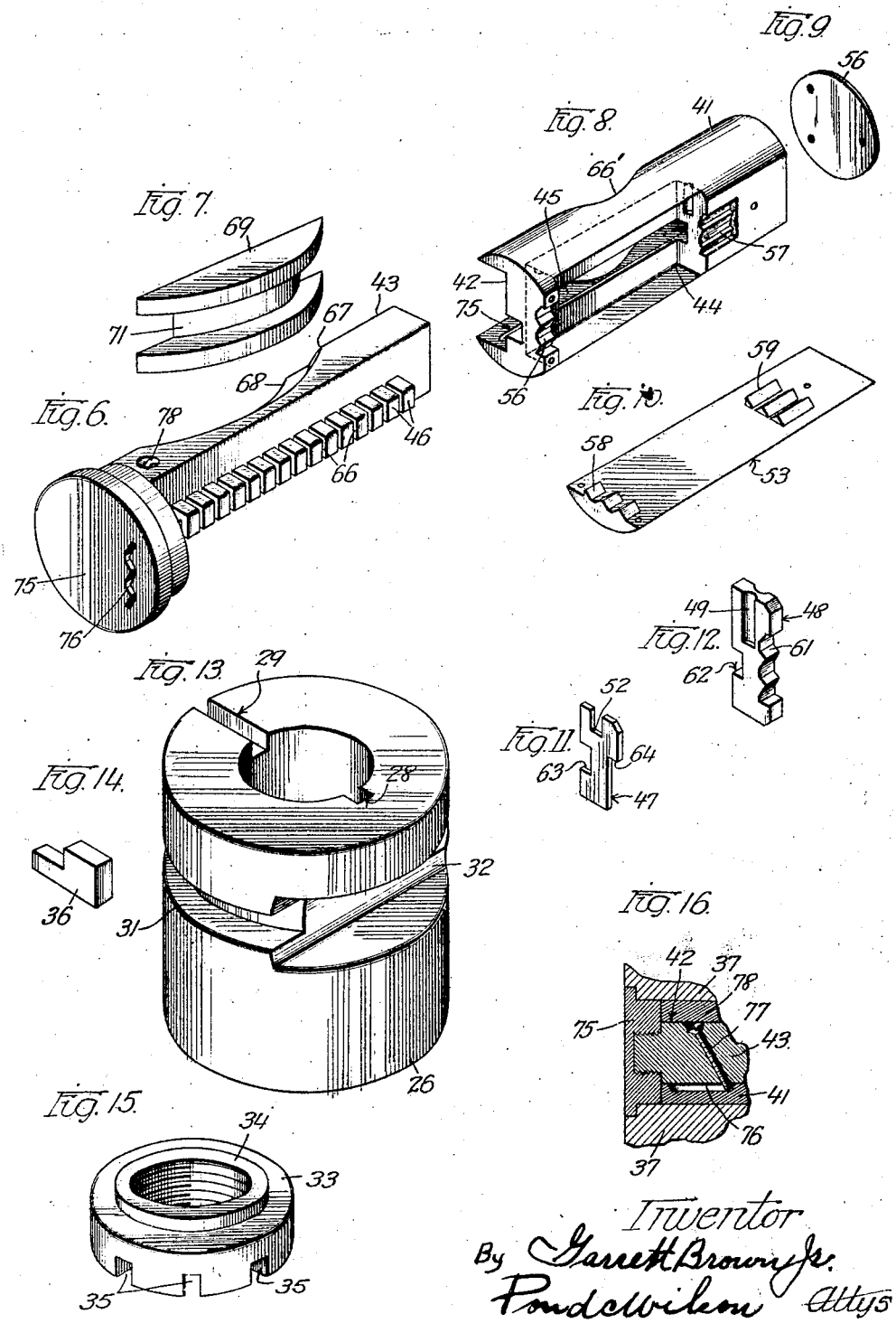
Inventor
By Garrett Brown Jr.
Poudel Wilson Attys Patented Mar. 31, 1925.

1,531,538

UNITED STATES PATENT OFFICE.

GARRETT BROWN, JR., OF CHICAGO, ILLINOIS.

AUTOMOBILE LOCK.

Application filed January 3, 1920. Serial No. 349,149.

*To all whom it may concern:*

Be it known that I, GARRETT BROWN, Jr., a citizen of the United States, residing at Chicago, in the county of Cook and State of Illinois, have invented certain new and useful Improvements in an Automobile Lock, of which the following is a specification.

This invention relates to devices for preventing theft and unauthorized use of automobiles and other motor vehicles and pertains more particularly to that type of automobile lock wherein the steering gear is rendered inoperative by disconnecting the steering wheel from the steering post so that the wheel will rotate freely thereon.

One of the primary objects of my present invention is to provide a device of the general character indicated, which can be readily and easily manipulated by the owner of the vehicle to lock the steering wheel to the steering post for driving purposes and to release the wheel from connection with the post when the vehicle is left standing and which shall be so constructed that it is incapable of manipulation without the use of the proper key.

Another object of the invention is to provide a lock which cannot be tampered with by picking or by demolition and which shall be so constructed and applied to the steering wheel that the lock cannot be removed, broken off or drilled into so as to be operated.

A further object of my invention is to provide a device of the character specified which can be readily applied to the steering posts of any of the various makes of cars on the market and one which will be simple in construction, cheap to manufacture and reliable and durable in use.

Another feature of my invention resides in the fact that when the steering wheel is disconnected from the steering post, it cannot be re-connected therewith by wedging or pinning methods but can only be re-connected through the medium of the lock when manipulated by its proper key and furthermore, a device constructed in accordance with my invention leaves no exposed surfaces to which a wrench or other implement might be applied for the purpose of turning the steering post to control the steering gear independently of the steering wheel.

Other objects and many of the inherent advantages of my invention should be readily appreciated by those skilled in the art as the same becomes better understood by reference to the following description when considered in connection with the accompanying drawings.

Referring to the drawings:

Fig. 3 is a vertical sectional view on the line 3—3 of Fig. 2;

Fig. 4 is a view similar to Fig. 2, showing the position of the parts when the device is locked with the steering wheel free to revolve about the steering post;

Fig. 5 is an enlarged fragmentary view through the lock proper, showing the arrangement of the tumbler actuating springs;

Fig. 6 is a perspective view of the longitudinally movable lock member;

Fig. 7 is a similar view of the locking element through which connection is established between the steering wheel and its post;

Fig. 8 is a similar view of the lock casing;

Fig. 9 shows the hardened steel plate at the inner end of the casing;

Fig. 10 is a perspective view of the removable side wall of the lock casing;

Figs. 11 and 12 are perspective views of one of the lock tumblers and one of the lock tumbler spacers respectively;

Fig. 13 is a perspective view of the steering post collar;

Fig. 14 is a similar view of the key for locking the cap nut to the collar;

Fig. 15 is a perspective view of the cap nut; and

Fig. 16 is a fragmentary sectional view on the line 16—16 of Fig. 4.

Figure 1:
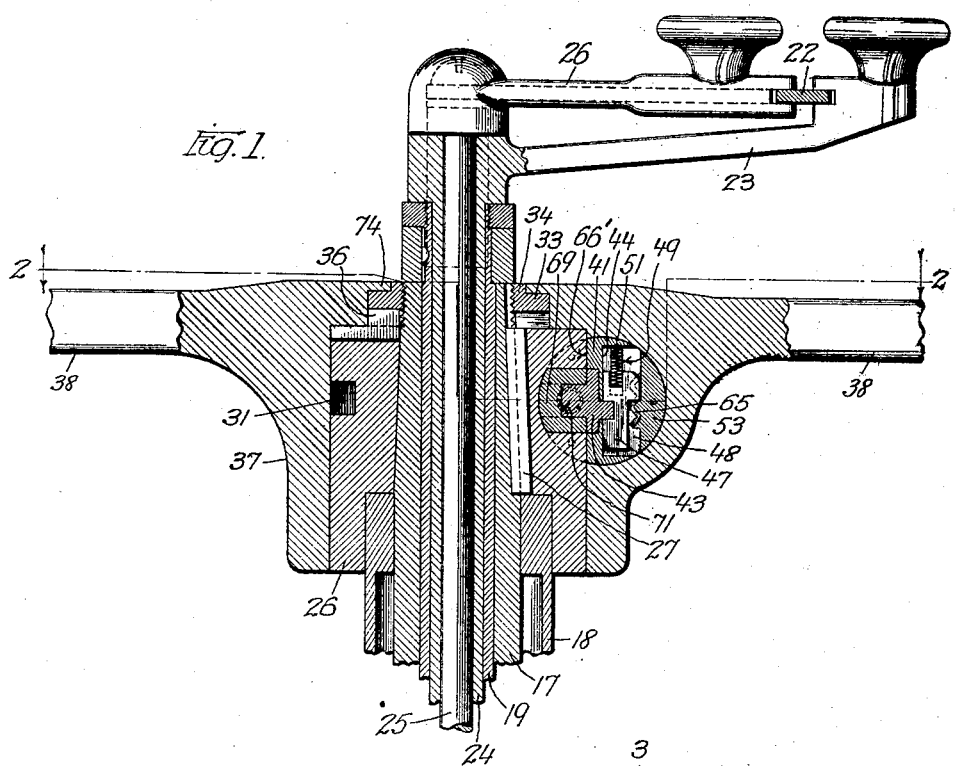
Fig. 1 is a vertical medial sectional view of a steering post and wheel equipped with my invention.

Referring now to the drawings more in detail, reference character 17 indicates the steering post of an automobile, surrounded by the usual hollow column 18. Within the steering post 17 there is customarily disposed the stationary post 19, upon the upper end of which the arms 21 carrying the sector 22 is mounted. The throttle lever 23 is carried by a hollow shaft 24 arranged within the stationary post 19, and within the shaft 24 is disposed the spark controlling shaft 25 carrying at its upper end the spark lever 26. The parts thus far described are of standard construction and are shown on the drawings merely as illustrative of a steering column structure, but as will be apparent hereafter, my invention is applicable to any type of steering column and is not restricted to the specific type herein illustrated and described.

In standard automobile construction, the steering post 17 is provided with a longitudinal key-way 18 and the hub of the steering wheel which fits snugly over the tapered upper end of the post is provided with a companion key-way so that upon the insertion of a spline key into these key-ways, the wheel is rigidly attached to the post.

In applying my invention to a car, the standard steering wheel is removed and a collar 26, best shown in Fig. 13, is slipped onto the upper end of the post and rigidly secured thereto by a spline key 27 which may be the same key that was previously utilized to lock the standard steering wheel to the post.

From an inspection of Fig. 13, it will be observed that the collar 26 is constructed to provide a longitudinal key-way 28 for the reception of the key 27, a radial key-way 29, the purpose of which will be later explained, a circumferential groove 31 intersected at one side by a transverse groove 32 of greater vertical heighth than the groove 31, the inner vertical wall of this groove being a chord of the circumference of the collar and forming an abutment surface extending transverse to the longitudinal axis of the collar.

After this collar has been positioned on the steering post and keyed thereto, a cap nut 33 (Figs. 1 and 15) is threaded onto the upper end of the steering post to preclude access to the collar and its spline key and also to prevent the collar from being driven upwardly and off from the post from beneath. This nut is formed to provide a central upwardly projecting flange 34 and at its bottom it is provided with a series of radially disposed slots 35. In the final threading movement of the nut on the post, one of these slots 35 is disposed in vertical alinement with the radial slot 39 formed at the top of the collar 26 and a key 36 (Figs. 1 and 14) is then inserted into these alined slots so as to lock the nut against unscrewing. It will be manifest therefore, that the collar 26 is not only rigidly secured to the steering post but that it is locked in position so that it cannot be driven off or otherwise removed from the post.

The steering wheel proper consists of a central hub designated generally by reference character 37, from which the spokes 38 of the wheel radiate tangentially to the hub instead of radially therefrom, as is customary. The spokes at their outer ends are connected with the usual wheel rim (not shown). In substantial alinement with the longitudinal axis of one of the spokes, the hub is drilled to provide a cylindrical recess 39 in which the lock proper is disposed. The purpose of having the lock in substantial alinement with one of the spokes is to obviate possibility of drilling into the hub lengthwise of the lock with a view of driving the lock out of its recess or socket, so that its locking function would be destroyed. By constructing the wheel with the spokes radiating tangentially from the hub and forming the recess for the lock in alinement with one of the spokes, the possibility of driving the lock out of the hub is obviated.

The lock proper consists of a casing 41 (Fig. 8) provided at one side with a longitudinal recess 42 for the reception of the sliding locking member and at its opposite side with a recess 44, in which the tumblers and spacers are positioned. A slot 45 connecting the recesses 42 and 44 permit the spaced teeth or projections 46 extending laterally from the locking member 43 to project into the recess 44 for engagement by the tumblers 47, one of which is shown in Fig. 11.

Figure 2:
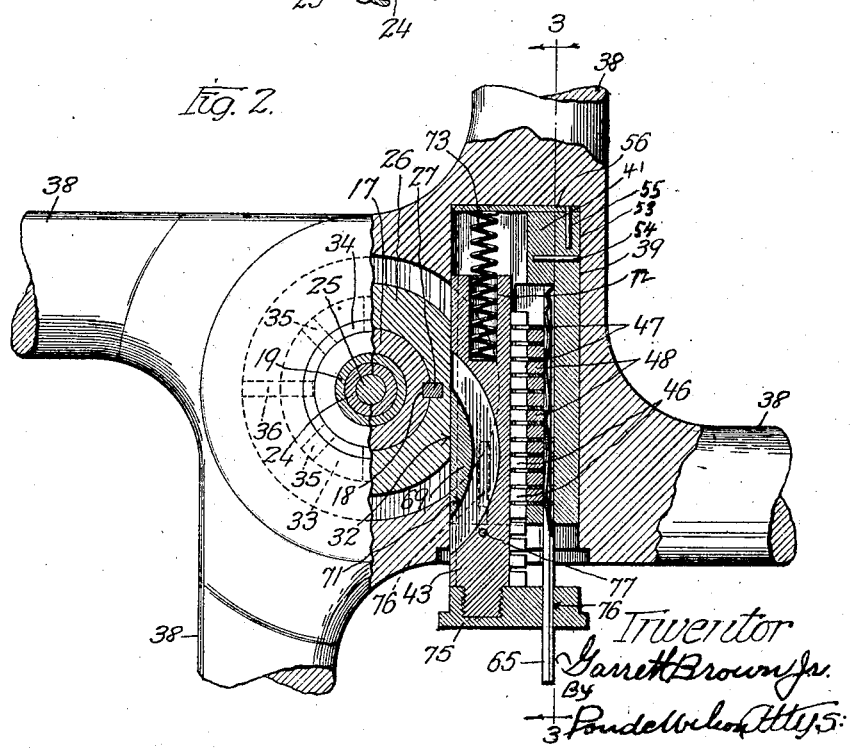
Fig. 2 is a horizontal sectional view taken on the line 2—2 of Fig. 1, showing the steering wheel locked to the post for driving purposes.

These tumblers 47, a series of which are used, are arranged in the recess 44 of the lock casing in alternation with the spacers 48 (Fig. 12) and in the recesses 49 formed in the upper ends of the spacers are disposed the tumbler actuating springs 51, as shown in Fig. 5, the lower ends of the springs being seated in the sockets 52, formed in the upper ends of the tumblers 47. It will thus be apparent that the springs 51 normally urge the tumblers downwardly. After the tumblers, spacers and springs have been assembled in the recess 44, they are held in position by the removable side wall 53 of the casing which is placed in position as shown in Figs. 1 and 2, and secured to the casing 41 by a plurality of pins 54 one of which is indicated by reference character 54 in Figs. 2 and 4, and the holes for the other pins being shown in Figs. 8 and 10.

As a further means for securing the side wall 53 to the casing and as a protection against drilling into the end of the lock, I then secure upon the inner end of the casing and to the side wall by a plurality of pins 55, a hardened steel plate 56. The lock casing with the tumblers and spacers assembled therein may now be inserted into the socket 39 formed in the hub of the steering wheel.

It should be observed at this point that the casing 41 is provided at its forward end with serrations 56 and near its rear end with similar serrations 57. The plate 53 is likewise equipped with serrations 58 and 59 corresponding with the serrations 56 and 57 respectively on the casing and slightly spaced therefrom so as to provide a vertically sinuous or zig-zag slot for the reception of a correspondingly shaped key. The edges of the spacers 48 which are opposed to the wall 53 are likewise provided with similarly shaped serrations 61 and when assembled in the casing, the serrated edges of the spacers in conjunction with the serrations on the casing and on the side wall provide a substantially continuous guideway or slot for the key.

Since the keyway is serrated from top to bottom, it will be manifest that the lock cannot be picked by the insertion of a flat blade or tool of any kind as such an instrument cannot be inserted into the keyway.

The locking member 43 is slidable longitudinally in the recess 42 of the casing and the teeth 46 as previously stated, extend laterally into the recess 44. The spacers 48 are each cut away at their rear edge as indicated at 62, these cut away portions being all located at the same distance from the bottoms of the spacers so that when the spacers rest in the recess 44 of the lock casing, the cut away portions 62 are all in horizontal alinement and the teeth 46 on the member 53 will slide freely through the spacers. The tumblers 47 are likewise provided on their rear edges with cut away portions 63, each adapted to permit the teeth 46 to move transversely of the tumblers when the cut away portions 63 are in horizontal alinement with the cut away portions 62 of the spacers. The forward edge of each tumbler is provided with a shoulder 64 adapted to be engaged by the upper edge of a key inserted into the lock. The key indicated by reference character 65 is serrated at its upper edge as shown in Fig. 3 and when the key is fully inserted in the lock, the tumblers are moved vertically varying distances against the force of the springs 51 until the cut away portions 63 are all disposed in alinement so as to permit longitudinal movement of the member 43. When the key is withdrawn these tumblers will be moved downwardly by their respective springs to dispose the portions of the rear edges of the tumblers above the cut away portions 63 in the spaces 66 between the teeth 46, thereby locking the member 43 against longitudinal movement. It will be manifest therefore, that longitudinal movement of the member 43 in either direction can be effected only when the key 65 is fully inserted in the lock and that upon withdrawal or partial withdrawal of the key some at least of the tumblers will be disposed between the teeth 46 to lock the member 43 against longitudinal movement.

The casing 41 has a portion of its rear side cut away as indicated by reference character 66' on an arc concentric with the collar 26 and similarly the member 43 has its rear side cut away as indicated by 67, so that rotative movement of collar 26 with the steering post relatively to the steering wheel may take place. The cut away portion of the member 43 is provided with a laterally projecting arcuate rib 68 adapted to slidingly fit in the groove 31 of the collar 26. It will be obvious that when the rib 68 is engaged in the groove 31, the steering wheel will be locked against longitudinal withdrawal from the steering post.

A locking element 69 (Fig. 7) having a flat rear face and a curved outer face struck on an arc concentric with the collar 26 is adapted to slidingly fit within and fill the groove 32 of the collar 26 and is provided on its curved face with a groove 71, which, when the element is disposed in the collar 26, forms a continuation of the groove 31 in the collar. In other words, when the element 69 is positioned in the groove 32, a continuous annular groove around the collar 26 is provided by the groove 31 formed by the collar and the groove 71 formed in the locking element. The rib 68 engaged in this groove securely locks at all times the steering wheel against longitudinal displacement from the collar.

In assembling the lock, the spacers 48 and the tumblers 47 are arranged in alternation in the recess 44 of the casing, the springs 51 being disposed above the tumblers and lying partially within the recess 49 of the spacers as shown in Fig. 5.

The side wall 53 is then pinned to the casing to hold the tumblers and spacers in position and the hardened end plate 56 is then attached to the end of the casing and to the end of the wall 53.

The lock casing with the tumblers assembled therein is now inserted into the recess 39 of the steering wheel. The wheel is then slipped over the upper end of the steering post into operative position as shown in Fig. 1. It should be noted that the cut away portion 66 of the lock casing is formed on a radius equal to the radius of the collar 26 so that the wheel hub with the lock casing therein may be slipped longitudinally over the upper end of the collar and when positioned around the collar, the collar fits into the cut away portion of the casing and precludes withdrawal of the casing longitudinally from its recess. From Fig. 1 it will be noted that the wheel hub is so cored that it entirely surrounds the collar 26, also the cap nut 33, and has a flange 74 extending radially inwardly which covers the cap nut with the exception of the relatively narrow central flange 34. The wheel when positioned on the steering post also encloses the key 36 so that neither this key nor the key 27 which locks the collar to the steering post proper can be removed while the wheel is in operative position.

After the wheel has been positioned upon the post as just explained, the key 65 which is serrated longitudinally from end to end to fit the serrated key way formed by the lock casing and the spacers, as previously described, is inserted into the lock to bring the recesses 63 of the tumblers into horizontal alinement in the plane of the slot connecting the recesses 42 and 44 of the casing. The locking element 69 is then positioned in the cut away portion of the locking member 43, the rib 68 of this member being disposed in the groove 71 of the locking element so that the outer faces of the element and member 43 are flush; the locking element in fact, constituting a unitary part of the sliding member 43. The rear end of the inner end of the member 43 is provided with a longitudinal recess or bore 72, in which a coiled expansion spring 73 is inserted, whereupon the member 43 carrying this spring and the locking element 69 are slid longitudinally into the lock casing. In order to permit this insertion of the member 43 and its cooperative parts, the wheel must be revolved on the collar 26 until the transverse groove 32 in the collar is in exact alinement with the inner wall of the lock receiving recess in the wheel hub. When this alinement has been secured, the member 46 can be pushed inwardly into the lock casing into the position shown in Fig. 2.

The outer end of the member 43 is equipped with a plate, or head 75, which is screwed onto the member as shown in Figs. 2 and 16, and this head is provided with a serrated keyway 76 extending therethrough in alinement with the keyway in the lock casing. When the member 43 is inserted into the casing the head 75 is slipped over the outer end of the key which is serrated to its extreme end for this purpose.

For the purpose of retaining the member 43 in operative position in the casing, I have provided in the bottom wall of the recess 42, a longitudinal groove 76 and have provided the member 43 with an inclined tapped opening adapted to receive a screw 77 which may be inserted when the member 43 is in the position shown in Fig. 2. The upper end of this opening in the member 43 is countersunk, as indicated at 78, so that the head of the screw does not project above the upper face of the sliding member.

When the member 43 has been fully inserted so that the head 75 lies flush with the face of the steering post hub, as shown in Fig. 4, the key 65 may be withdrawn, and as it recedes from the keyway, the tumblers 47 will be successively depressed by their respective springs 51 so that the portions of the tumblers above the recesses 63 will be disposed in the spaces 66 between the teeth 46 on the locking member 43, thus effectually locking this member against longitudinal movement. In this position of the parts the sector shaped locking element 69 just fills the transverse groove 32 in the collar and is disposed within the perimeter of the collar and at the same time within the planes defining the longitudinal faces of the locking member 43. The locking element 69 therefore, constitutes a movable part of both the collar 26 and the member 43. When the member 43 is in its inmost position the steering wheel is free to spin about the collar, the locking element in this case remaining within the perimeter of the collar while the wheel with the lock disposed in its hub is free to turn around the collar and the locking element. This movement will be obvious from an inspection of Fig. 4 in which the wheel has been rotated slightly relatively to the steering post.

It will be observed that when the parts are assembled, the rib 68 of the locking member 43 is engaged in the groove 71 of the locking element and since the locking element can not move longitudinally of the collar by reason of the top and bottom walls of the groove 32 between which it is disposed, the wheel can not be displaced longitudinally of the collar. When the wheel is rotated relatively to the collar, this rib 68 engages in the groove 31, which is in effect a continuation of the groove 71, so that in any angular position of the steering wheel relatively to the collar, the wheel is effectually locked to the collar so that it can not be longitudinally removed.

When the member 43 is fully inserted and the key 65 withdrawn, the steering gear is rendered wholly inoperative by the steering wheel, since the wheel spins freely about the steering post. The lock casing can not be forced longitudinally out of its recess in the wheel hub, first, because access can not be obtained to the inner end of the casing to drive it out, and secondly, if access could be obtained, the curved surfaces of the cutaway portion of the casing engage with the perimeter of the collar so that longitudinal movement of the lock casing is absolutely precluded. It will also be observed that the member 43 can not be moved longitudinally since it is effectually locked by a series of tumblers engaged between the teeth 46, and since all of these tumblers must be exactly alined in order to permit withdrawal of the member 43, there is slight possibility of the lock being picked, particularly in view of the shape of the keyway, which is serrated from top to bottom throughout its length.

To unlock the device or in other words, to connect the wheel to the steering post for driving purposes, it is only necessary to insert the key 65 fully into the lock casing, whereupon the tumblers being brought into proper alinement by the key, the locking member 43 is forced outwardly into the position shown in Fig. 2 by the expansion spring 73, if the wheel is in such angular position that the locking element 69 is in exact alinement with the member 43. This alinement can be readily obtained by simply turning the wheel very slowly after the key has been inserted, and as soon as the proper alinement is attained, the spring will force the member 43 and the locking element as well longitudinally outwardly in the position shown in Fig. 2. It will be apparent from this figure that when this movement has taken place, the wheel will be effectually locked to the collar 26 against rotation since both the flat face of the locking element 69 and the alined face of the member 43 engage with the wall of the recess 39 and also with the flat inner wall of the groove 32. The car may now be driven with the key 65 in position in the lock if desired, since the spring 73 will serve to retain the parts in locking relation. As a precaution against accidental movement of the member 43 inwardly against the force of the spring 73, the key may be withdrawn so that the member 43 will be effectually locked in its extended position by tumblers 47.

It will thus be obvious that no turning or rotative movement of the lock or key is required. In order to render the steering wheel inoperative with respect to the post, it is only necessary to insert the key, push inwardly upon the head 75 and then withdraw the key, leaving the wheel free to spin upon the post. In order to lock the wheel to the post, it is only necessary to insert the key, whereupon the parts will be moved into driving relation by the action of the spring 73.

It is believed that my invention, its construction, mode of operation and many of its inherent advantages will be understood and appreciated from the foregoing without further description, but it should be manifest that the details of construction illustrated and described may be varied within wide limits without departing from the essence of my invention, as defined in the following claims.

I claim:

1. In a steering wheel lock, the combination of a rotatable steering post element, a steering wheel surrounding said element, a locking device shaped to form a sector of said steering post element so that the wheel may rotate freely about said element including said device, the device being movable transversely of said element to a position partially outside the perimeter of said element to lock said wheel and element against relative rotation, and means for actuating said device.

2. In a steering wheel lock the combination of a steering post element, a steering wheel mounted thereon, a member mounted in the hub of said wheel, and movable therein, and a locking element controlled by said member for locking the wheel against rotative movement about said steering post element, said locking element being designed to move with the steering post element relatively to the wheel so as to permit rotation of the wheel about said steering post element to prevent movement of the wheel longitudinally of the steering post element.

3. In a steering wheel lock the combination of a steering post element provided at one side with a transverse groove, a steering wheel having a hub surrounding said element and provided with a recess parallel with said groove, and locking means disposed in said recess, said locking means comprising a member movable longitudinally in said recess and a co-operating locking element engaged in said groove, said locking element being movable by said member so as to lock the wheel and steering post element against relative rotative movement and also movable into a position wholly within said groove so as to move with said steering post element relatively to the wheel.

4. In a steering wheel lock the combination of a steering post element provided at one side with a transverse groove, a steering wheel having a hub surrounding said steering post element, and provided with a recess alined with said groove, a member movable longitudinally in said recess, a locking element controlled by said member and adapted to be positioned in said groove within the perimeter of said steering post element so as to permit relative rotative movement between said steering post element and the wheel and also movable by said member longitudinally of said groove into a position to lock said wheel and steering post element against relative rotative movement.

5. In a steering wheel lock the combination of a steering post element provided with a circumferential groove, a locking element consisting of a movable sector of said steering post element and forming a sector of said circumferential groove, a steering wheel comprising a hub surrounding said groove, and provided with a recess opposed to said groove, and a member longitudinally movable in said recess having a rib engageable in said groove to hold the wheel against longitudinal displacement relatively to said steering wheel element, said member being engaged with said locking element to move the same into a position projecting outside the perimeter of said steering post element to lock the wheel and steering post element against relative rotative movement.

6. In a steering wheel lock the combination of a steering post element, a steering wheel mounted thereon and having a recess therein intersecting the perimeter of said steering post element, a key controlled lock disposed in said recess, and a sector shaped locking element disposed in said recess and cooperatively engaged with said lock and said steering post element, and adapted to move with said steering post element relatively to the lock and also to move with said lock relatively to said steering post element.

7. In a steering wheel lock the combination of a steering post element, a steering wheel mounted thereon and provided with a hub having a recess formed therein intersecting the perimeter of said steering post element at one side thereof, a key controlled lock disposed in said recess, including a member movable transversely of said steering post element and a sector shaped locking element engaged with said member and with said steering post element, said locking element being movable with said member to lock the wheel against rotation on said steering post element and also being movable with said steering post element relatively to the wheel to permit rotative movement of the wheel about said steering post element and said locking element.

8. In a steering wheel lock the combination of a cylindrical steering post element, a steering wheel, a lock mounted in the hub of said wheel, said lock comprising a longitudinally movable member adapted to intersect the perimeter of said steering post element, and a sector shaped locking element associated with both said steering post element and said member and capable of movement with either relatively to the other.

9. In a steering wheel lock the combination of a cylindrical steering post element provided at one side with a sector shaped recess, a steering wheel mounted thereon, a lock arranged in the hub of said wheel and provided with a sector shaped recess, and a sector shaped member disposed in said recess and engageable with said lock and with said steering post element, and capable of movement with either relatively to the other.

10. In a steering wheel lock, the combination of a steering post, a collar mounted thereon and provided with a circumferential groove, one face of said collar being transversely grooved, a steering wheel surrounding said collar and provided with a recess alined with said groove, a lock disposed in said recess, comprising a longitudinally movable member and key actuated tumblers for locking said member against longitudinal movement, said member being provided with a rib engaged in the groove of said collar to lock the wheel against longitudinal displacement, and a locking element slidably disposed in the transverse groove of said collar and lying within the perimeter of said collar, said element when disposed in said groove permitting movement of the wheel around the collar but serving to lock the wheel against rotation on the collar when projecting beyond the perimeter of said collar.

11. In a steering wheel lock, the combination of a steering post, a collar keyed thereto, a cap nut threaded onto said post above the collar, a key engaging said collar and said nut to lock said nut against rotation, a steering wheel surrounding said nut, key, and collar, a lock mounted in the hub of said wheel, and means cooperating with said lock and collar and controlled by the lock whereby the wheel is at all times locked against longitudinal movement on the collar and may be locked against rotative movement relatively to the collar or permitted to rotate freely around the collar.

12. In a steering wheel lock, the combination of a steering post, a steering wheel, a lock mounted in the hub of said wheel, said lock comprising a casing with tumblers disposed therein, said casing being cut away on one side to permit positioning of said wheel upon said post by movement longitudinally of the post, and a locking member slidable into position in the lock casing transversely of the post whereby the wheel is locked against withdrawal from the post, said member having means adapted to be engaged by said tumblers for locking said member against longitudinal movement.

13. In a steering wheel lock, the combination of a steering post, a cylindrical collar mounted thereon, a steering wheel, a lock mounted in the hub of said wheel and comprising a casing and a locking member longitudinally slidable therein, both said casing and said member being cut away on an arc concentric with said collar, means for limiting the longitudinal movement of said locking member relatively to the casing, and a locking element controlled by said member for locking the wheel against rotation relatively to said collar.

14. The combination of inner and outer annular bodies having recesses in their opposed sides, and a locking bolt consisting of separate sections received in and completely filling said recesses, one of the sections being formed with a convex surface conforming to the curvature of and flatly engaging the interior of the outer body.

15. The combination of inner and outer bodies having their opposed sides formed with recesses cooperating in the formation of a cylindrical opening, and a locking bolt completely filling said opening to rigidly connect the bodies and being split longitudinally to form a pair of separate sections.

GARRETT BROWN, Jr.